United States Patent Office

3,522,238
Patented July 28, 1970

3,522,238
ACIDIFIED ETHYLENIMINE MODIFIED
CEREAL FLOURS
John C. Rankin and Charles R. Russell, Peoria, Ill., assignors to the United States of America as represented by the Secretary of Agriculture
No Drawing. Filed Jan. 11, 1968, Ser. No. 697,032
Int. Cl. C08b 19/01
U.S. Cl. 260—233.3                     1 Claim

ABSTRACT OF THE DISCLOSURE

Cationic pigment retention aids for use in the manufacture of paper which aids are equally effective in both soft water and hard water are produced by acidifying cereal grain flours that have been reacted with 2 to 3 weight percent of ethylenimine. The acidified aminoethylated cereal grain flour derivatives contain from about 1.2 grams to 1.8 grams of chemically bound ethylenimine constitutent per 100 grams dry basis weight of flour and a one percent aqueous dispersion of the acidified aminoethylated cereal grain flour has a pH of between about 4.0 to 5.0.

BACKGROUND OF THE INVENTION

This invention relates to low cost cationic retention aids for pigments used in the manufacture of paper, which aids, unlike the known commercially available cationic starches, do not suffer impaired activity when used in hard water rather than in soft water that cannot be expected to be supplied for paper mill operations.

More specifically, this invention relates to the unobvious discovery that notwithstanding the presence of considerable protein, i.e., gluten or chemically modified gluten in ethylenimine-reacted cereal grain flours including the ethylenimine derivatized flours of wheat, grain sorghum, and corn, acidification of the aminoethylated cereal grain flours to about the protein isoelectric point, i.e., a pH of between about 4 and 5 not only unexpectedly improves the dispersibility of the derivatized flour but of much greater importance, eliminates the costly weakening of cationic effect in mineral-containing water that seriously limits the performance of the various relatively costly commercially available cationic starches.

The extensive use by the paper and mineral separation industries of cationic products as pigment retention aids capable of adjunctly serving as internal sizing agents or as flocculents has stimulated the introduction of a variety of cationic starches resulting from the reaction of starch with different organic nitrogen compounds. Despite the significantly lower cost of cereal flours as compared with the corresponding starches, none of the newly patented or commercially available cationic retention aids of which we are aware comprise amine derivatives of cereal grain flours, notwithstanding the use of the term "guar flour" in Nordgren, U.S. Pat. No. 3,303,184, which relates to the aminoethylation of guar endosperm-derived, finely divided, exclusively galactomannan polymer starting material.

Kerr et al., Die Stärke, 4(10):255 (1952), show the uncatalyzed aminoethylation of starch with various proportions of ethylenimine, and also teach that the thereby produced positively charged and distinctly basic polymers are capable of flocculating dispersed negative colloids such as bentonite and other silicas.

Drake et al., U.S. Pat No. 2,656,241, teach the aminoethylation of cellulose by reacting ethylenimine with an aminoalkylated cellulose to form poly(ethyleneamino)-aminoethyl groups exhibiting ion-exchange properties.

Hartman et al., U.S. Pat. No. 2,972,606, teach the acid-catalyzed modification of cellulose or of polyvinyl alcohol by ethylenimine to provide high nitrogen content aminoethylated graft polymers of those polyhydroxy compounds for subsequent per-oxidation to propellant compositions, the aminoethylation reaction requiring a nonpolar, nonreactive solvent or diluent and being inhibited by water, methanol, ethanol, or dimethylformamide.

Thus, the primary object of our invention is the production of acidified aminoethylated cereal grain flours which acidified aminoethylated flours, in marked distinguishment from the corresponding nonacidified aminoethylated flour ethers and from the commercially available cationic starches per se or acidified cationic starches, do not suffer a marked loss of pigment retention activity when used in ordinary hard water compared with their activity in naturally soft or in distilled water.

In accordance with above object of the invention we have now unexpectedly discovered that the protein-handicapped dispersibility and the hard water-depressed cationic properties of ethylenimine-derivatized cereal grain flours are unexpectedly eliminated by adjusting the distinctly alkaline pH of the aminoethylated flour to about the isoelectric value of protein, i.e., to a level such that a 1 percent aqueous dispersion of the acidified aminoethylated flour containing about from 1.2 to 1.8 grams of chemically bound ethylenimine constituent per 100 grams dry basis weight of flour, exhibits a pH of between about 4.0 and 5.0, the foregoing beneficial discovery being even more surprising in view of the fact that acidification of aminoethylated starch, made by the method of Kerr et al., supra or other cationic starches does not cause the previously alkaline aminoethylated starch to exhibit about the same extent of pigment retaining effect in hard water that it exhibits in soft water, as will be indicated in certain of the following specific embodiments and supporting data.

The following general remarks are intended to set forth the preferred conditions for operating our invention. The raw cereal flour need not be anhydrous. It is fully capable of reacting with ethylenimine in the absence of solvent or of a catalyst when having a normal 10–15 percent moisture content. To minimize the formation of by-product polyethylenimine, the uncatalyzed aminoethylation reaction is conducted without added solvent at a temperature not above 75° C. and under sufficient vacuum to constantly maintain the ethylenimine in the more reactive vapor phase. Then the reaction temperature is lowered, the vacuum is terminated, and the crude aminoethylated flour is sprayed with sufficient dilute mineral acid or organic acid to provide a pH of 4 to 5 when 1 gram of the previously alkaline but now acidified aminoethylated flour product is dispersed in 100 ml. of distilled water. Incidentally, the presence in the product of moderate amounts of byproduct polyethylenimine, the formation of which is enhanced by the acidification step, does not necessitate extractive removal thereof inasmuch as its presence resulted in only an almost undetectable lessening of retention activity by the crude product.

The following specific examples are presented to more fully describe the invention.

EXAMPLE 1

One hundred sixteen grams of commercially obtained wheat flour having a 14 percent moisture content and analyzing 1.6 percent Kjeldahl nitrogen was placed in a laboratory model sigma-blade kneading machine equipped with an ethylenimine resistant removable transparent plastic cover, reagent admitting means, vacuum line, pressure gauge, and a valved jacket for confining steam or coolant. A total of 3.0 grams of ethylenimine was admitted in dropwise manner during the course of 3 minutes and the mixing was continued at atmospheric pressure for 4 hours, the temperature of the reaction being maintained at 60° C., thus keeping the ethylenimine reagent in the vapor phase. Then, under ambient conditions, a total of 6.9 ml. of dispersed droplets of 6 N HCl was slowly sprayed onto the continually mixed room temperature aminoethylated flour. After 3 minutes of stirring, the acidified crude product was obtained wherein 60 percent of the ethylenimine reactant was in chemically bound form and 40 percent thereof was in the form of byproduct polyethylenimine that was subsequently removed by extraction with 60-perent aqueous ethanol. After said extractive removal of the byproduct polyethylenimine, Kjeldahl analyses of the purified acidified aminoethylated flour product and an identically extracted flour control showed the amino nitrogen content from the aminoethylation to be 0.58 percent corresponding to the chemical incorporation of 60 percent of the ethylenimine reagent. A 1-percent paste of the product in distilled water had a pH of 4. Essentially identical cationic efficiency values of 99 percent and 98 percent, respectively, in distilled water and in tap water having a CaCO hardness of 256 p.p.m. were obtained when a 0.5 percent paste of the alcohol-extracted pure product was tested photometrically for the retention on dilute cellulosic pulp fibers of "Halopont Blue" (an intensely blue organic pigment) by the method of Mehltretter et al., TAPPI 46:506 1963). Within a fractional point the same values were obtained when the unextracted crude product containing ca. 1.2 percent by weight of polyethylenimine was substituted for the purified acidified aminoethylated flour product.

The absence of significantly decreased retention efficiency in hard water as shown above for the acidified aminoethylated flour of the invention differs conspicuously from the decreases shown in Table I obtained with the best known proprietary cationic starch products in the same test.

TABLE I

| Proprietary Cationic Starch | pH of 1% dispersion | Percent Retention of Pigment | |
|---|---|---|---|
| | | Dist. H₂O | Tap H₂O |
| "QTAC No. 3891," quarternary ammonium alkyl ether made by reacting starch and a glycidyl quarternary amine as in Paschall, U.S. Patent No. 2,876,217 | 7 | 98 | 85 |
| "Cato No. 8," tertiary alkyl ether made by reacting starch and β-halogenated amine as in Caldwell et al., U.S. Patent No. 2,813,093 | 4 | 98 | 73 |
| "Cato No. 15" | 6 | 99 | 71 |

EXAMPLE 2

Example 1 was repeated excepting that only 2 grams of ethylenimine (2 perent by weight of the flour) was added and only 4.6 ml. of 6 N HCl was added to the resulting aminoethylated flour. A 1-percent aqueous paste of the nonacidified aminoethylated flour had a pH of 9 whereas a corresponding paste of the acidified product had a pH of 5. The respective pigment retention values of the nonacidified aminoethylated flour in distilled water and in hard water were 74 percent and 75 percent as against efficiencies of 99 percent and 96 percent for the acidified product of the invention.

Bleached handsheets containing clay pigment ("Huber Hi-White"), were prepared from tap water by TAPPI method (T205m58) following the addition to the pulp of a 1-percent aqueous paste of either the above product and for comparison a representative commercial cationic starch. Prepared handsheets were then ashed to determine the retention content of clay pigment. Results are given below in Table II.

TABLE II

| Sample | pH of 1% dispersion | Percent Ash |
|---|---|---|
| Control | | 1.83 |
| Aminoethylated flour (Not acid treated) | 9 | 1.72 |
| Aminoethylated flour (Acidified) | 5 | 2.96 |
| "Cato No. 8" (proprietary tertiary alkyl starch ether) (Acidified) | 4 | 2.19 |

Acidified aminoethylated flour showed a 62 percent increase in clay pigment retention in handsheets over what was retained by the control whereas a commercial cationic starch showed only a 20 percent increase. The nonacidified aminoethylated flour gave a slightly lower ash value than the control.

EXAMPLE 3

Example 1 was repeated excepting that sorghum flour was substituted for the wheat flour. A 1-percent paste of the nonacidified aminoethylated sorghum flour had a pH of 9 whereas that of the acidified product had a pH of 4. In distilled water the nonacidified aminoethylated sorghum flour by the Halopont pigment test exhibited a dye retention efficiency of 86 percent; in hard water the efficiency value was 85 percent. The corresponding values for the acidified product of the invention were 99 percent and 97 percent, respectively.

EXAMPLE 4

Example 1 was repeated excepting that commercial corn flour was substituted for the wheat flour. The retention efficiency values of the nonacidified and of the acidified aminoethylated corn flours differed by only a 1 percentile point from the corresponding values set forth in Example 3.

In addition to the superior cationic retention aid properties set forth in the above examples, wet-end additions of the acidified aminoethylated flours at levels respectively of 1 percent or 5 percent based on the dry weight of the cellulosic fibers to papermakers unbleached softwood sulfate pulps increase the dry burst strengths of the resulting paper handsheets by 28 percent and 50 percent respectively while increasing the dry breaking length value in meters from a control value of 7100 to 8400 meters (1 percent addition) and 9500 meters (5 percent addition). The acidified aminoethylated corn flour provided somewhat greater dry strength increases than the corresponding wheat and sorghum species.

Another unobvious property of the acidified cationic flours of the invention that has an extremely important bearing on the disclosed practical applications of these novel agents despite their approximately isoelectric pH is the roughly 2 to 3 fold increase in total and protein dispersibilities over those per se of the unmodified starting flours at pH 6.

A nonexclusive, irrevocable, royalty-free license in the invention herein described, throughout the world for all purposes of the United States Government, with the power to grant sublicenses for such purposes, is hereby granted to the Government of the United States of America.

We claim:

1. Acidified aminoethylated cereal grain flour derivatives containing about 1.2 grams to about 1.8 grams of chemically bound ethylenimine constituent per 100 grams dry basis weight of the flour, the aminoethylation reaction having been conducted free of extraneous catalyst, at a temperature of not over 75° C. and under sufficient vacuum and temperature to constantly maintain the ethylenimine in the more reactive vapor phase, and wherein the so-produced aminoethylated cereal grain flour has then been treated with 4.6 to 6.9 ml. of 6 N mineral acid or its equivalent per 100 grams dry basis weight of the flour so that a 1-percent aqueous dispersion of the resulting acidified aminoethylated cereal grain flour product has a pH of between about 4.0 to 5.0, said product being characterized by insensitivity to hard water when used as a pigment retention aid in the manufacture of paper.

References Cited

UNITED STATES PATENTS 3,331,833   7/1967   Jarowenko _____ 260—233.3
3,354,034   11/1967  Jarowenko _____ 162—175

OTHER REFERENCES

Chemical Abstracts, vol. 47 (1953), 3593f.

DONALD E. CZAJA, Primary Examiner

M. I. MARQUIS, Assistant Examiner

U.S. Cl. X.R.

106—210; 162—175, 178; 260—17.3, 233.5